United States Patent [19]

Duckwall

[11] Patent Number: 5,784,648
[45] Date of Patent: Jul. 21, 1998

[54] TOKEN STYLE ARBITRATION ON A SERIAL BUS BY PASSING AN UNREQUESTED BUS GRAND SIGNAL AND RETURNING THE TOKEN BY A TOKEN REFUSAL SIGNAL

[75] Inventor: William S. Duckwall, Santa Cruz, Calif.

[73] Assignee: Apple Computer, Inc., Cupertino, Calif.

[21] Appl. No.: 565,986

[22] Filed: Dec. 1, 1995

[51] Int. Cl.$^6$ .................. G06F 13/14; G06F 13/362; G06F 13/368
[52] U.S. Cl. .................. 395/860; 395/300; 395/731
[58] Field of Search .................. 395/200.06, 287, 395/856, 857, 728, 730, 731, 732, 860, 300; 370/450, 451, 453

[56] References Cited

U.S. PATENT DOCUMENTS

| | | | |
|---|---|---|---|
| 4,590,468 | 5/1986 | Stieglitz | 340/825.5 |
| 4,680,581 | 7/1987 | Kozlik et al. | 340/825.06 |
| 4,682,324 | 7/1987 | Ulug | 370/447 |
| 5,053,946 | 10/1991 | Jain | 305/200.21 |
| 5,155,725 | 10/1992 | Khalil | 370/445 |
| 5,394,556 | 2/1995 | Oprescu | 395/200.5 |
| 5,444,847 | 8/1995 | Iitsuka | 395/287 |
| 5,630,173 | 5/1997 | Oprescu | 395/860 |

OTHER PUBLICATIONS

Wee et al. "A Partial-Destination-Release Strategy for the Multi-Token Ring Protocol", Local Computer Networks, 1992 17th Conf.

Jabbari et al. "A Token–Passing Data Associated Protocol for Local Computer Networks", Communications, 1989 IEEE Inter. Conf.

Akhtar et al. "An Extended Token Bus Protocol for Embedded Networks", Distributed Computing Systems, 1988 Inter. Conf.

Digital Interface for Consumer Electronic Audio/Video Equipment. Draft Version 2.0. Philips Electronics N.V. Matsushita Electric Ind. Co., Ltd Thomspon multimedia Sony Corporation IEEE 1394 Trade Association Meeting, Oct., 1995. Part 1 pps. 1–47, Part 2 p.7, Part 3 pps. 1–6.

P1394 Standard for a High Performance Serial Bus. P1394 Draft 8.0v3. Oct. 16, 1995, pps. 1–384.

*Primary Examiner*—Dinh C. Dung
*Attorney, Agent, or Firm*—Blakely, Sokoloff, Taylor & Zafman

[57] ABSTRACT

An electronic system comprises a plurality of components each having at least one communication node and being coupled together by communication links through the respective communication nodes so that the plurality of communication links and communication nodes form a bus which resembles an acyclic directed graph having established hierarchical parent-child relationships between adjacent nodes and a root node. Token passing style arbitration is implemented on the system, in one embodiment, in response to the root node sending out an unrequested bus grant, so that the node with the token has access to the bus.

19 Claims, 18 Drawing Sheets

ARBITRATION WIN

| WHAT CHILD SENDS ON PARENT PORT | | WHAT CHILD SEES ON PARENT PORT | | MEANING |
|---|---|---|---|---|
| A | B | A | B | |
| Z | 0 | Z | 0 | BUS REQUEST |
| Z | 0 | 0 | 0 | BUS GRANT |
| 0 | 1 | 0 | 1 | SEND DATA PREFIX |
| strobe | data | ignores | 0 | SEND DATA |
| 1 | 0 | 1 | 0 | SEND DATA END |

FIG. 6a

ARBITRATION LOSS

| WHAT CHILD SENDS ON PARENT PORT | | WHAT CHILD SEES ON PARENT PORT | | MEANING |
|---|---|---|---|---|
| A | B | A | B | |
| Z | 0 | Z | 0 | BUS REQUEST |
| Z | Z | 1 | 0 | RECEIVE DATA PREFIX |
| Z | Z | data | strobe | RECEIVE DATA |
| | | 0 | 1 | RECEIVE DATA END |

FIG. 6b

TOKEN STYLE ARBITRATION ON A SERIAL BUS BY PASSING AN UNREQUESTED BUS GRAND SIGNAL AND RETURNING THE TOKEN BY A TOKEN REFUSAL SIGNAL

FIELD OF THE INVENTION

The present invention relates generally to data communications and, more particularly, to a method of arbitration among nodes coupled together via a common interconnect.

BACKGROUND

Digital electronic systems such as computer systems often use a common interconnect to share information between components of the system. For computer systems, the interconnect is typically the computer bus.

One type of system interconnect is described by IEEE standards document P1394, draft 8.0v3, entitled P1394 Standard for a High Performance Serial Bus (hereinafter the "P1394 Serial Bus Standard"). A typical serial bus having a P1394 standard architecture is comprised of a multiplicity of nodes that are interconnected via point to point links, such as cables, that each connect a single node of the serial bus to another node of the serial bus. The nodes themselves are associated with respective components of the computer system and serve as interfaces between the component and the communication link.

Data packets are propagated throughout the serial bus using a number of point-to-point transactions, wherein a node that receives a packet from another node via a first point-to-point link retransmits the received packet via other point-to-point links. A tree network configuration and associated packet handling protocol insures that each node receives every packet once.

The P1394 Serial Bus Standard provides for an arbitrary bus topology wherein the hierarchical relationship between nodes of the serial bus is determined by the manner in which the nodes are connected to one another. A P1394 serial bus is configured in three phases: bus initialization, tree identification, and node self identification.

During bus initialization, the general topology information of the serial bus is identified according to a tree metaphor. For example, each node is identified as being either a "branch" having more than one directly connected neighbor nodes or a "leaf" having only one neighbor node. During tree identification, hierarchical relationships are established between the nodes. For example, one node is designated a "root" node, and the hierarchy of the remaining nodes is established with respect to the relative nearness of a node to the root node. Given two nodes that are connected to one another, the node connected closer to the root is the "parent" node, and the node connected farther from the root is the "child." Nodes connected to the root are the children of the root. The root is defined as not having any parent nodes. During self identification, each node is assigned a bus address and a topology map may be built for the serial bus.

The usual 1394 bus arbitration emulates the "look and feel" of typical bus arbitration. Any node wishing to transmit a data packet posts a request. In turn, the node receives back either a bus grant or bus denial. This method of arbitration is carried out by state machines embodied in all the physical layer ICs which are associated with the nodes. During the self identification process, however, the bus arbitration resembles a token style arbitration. At the outset of the self-identification process, the root node issues an unrequested bus grant. This grant passes down through the network to the target node which sends its self-identification packet in response. Then, as self-identification progresses, the root node issues a new grant which falls to the next target node, and so on. The process continues until all nodes, including the root node, have received a grant and sent their self-identification packets. In this self-identification process, the unrequested grant acts like a metaphorical token. One distinction, however, is that the grant (or token) must be regenerated by the root node (and not by the transmitting node) after each self-identification packet transmission. This differs from other token arbitration schemes (for example, token ring arbitration schemes) where the transmitting node also regenerates the token at the completion of its transmission.

As indicated, the normal P1394 serial bus arbitration resembles other serial bus arbitration in that nodes must first seek access to the bus before transmitting their data packets. It would be desirable to enhance the functionality of a communication system utilizing an P1394 serial bus architecture by implementing a token based arbitration method on such a bus at times other than node self-identification.

SUMMARY OF THE INVENTION

It is an object of the present invention to enhance the functionality of a computer system bus in which the nodes of the bus have been resolved into an acyclic directed graph.

This and other objects of the present invention are implemented in a computer system in which the various components of the system are interconnected via nodes on a communications bus. In one embodiment, once the topology of the nodes has been resolved into an acyclic directed graph, and the nodes have gone through an initialization process, the nodes are allowed to arbitrate for control of the bus in accordance with a token passing method. During the arbitration, a metaphorical token is passed through the acyclic directed graph in an order determined by predetermined selection criterion each node has established for selecting adjacent nodes. Provisions can be made for other arbitration methods, such as fair bus access arbitration.

BRIEF DESCRIPTION OF THE DRAWINGS

The present invention is illustrated by way of example and not limitation in the figures of the accompanying drawings, in which like references indicate similar elements and in which:

FIGS. 6a and 6b show the logic states transmitted and received on a node's A pair and B pair for the cases of an arbitration win and an arbitration loss, respectively.

DETAILED DESCRIPTION

A method and apparatus for implementing token style arbitration on an P1394 serial bus are described. In the following description, many specific details are set forth, such as various computer components, in order to provide a thorough understanding of the present invention. It will be appreciated, however, by those skilled in the art, that the present invention may be practiced without such specific details. In other instances, well known control structures and coding techniques have not been described in detail in order not to unnecessarily obscure the present invention.

Throughout this detailed description, numerous descriptive terms are introduced to provide metaphorical clarity to the description. For example, frequent references will be made to parent-child relationships between nodes in a given topology. The purpose of this is to provide the concept of "direction" to the finally resolved graph. As will be described, once an arbitrary topology has been reduced to an acyclic directed graph, there will be one node identified as the root node. The root node will not have a parent node. All nodes logically immediately adjacent to the root node are the child nodes of the root. The "tree" metaphor is completed by the inclusion of nodes referred to as "branches" and "leaves".

The bus architecture described herein, though described with reference to components for a single computer, in general has a broader scope, and could include test and measurement systems, positioning and robotic systems, and audio and video components, for example. The present invention may be applied to any arbitrarily assembled collection of nodes linked together as in a network of devices. It must also be noted that it is necessary to distinguish a node from a physical computer component. Each component to reside on the bus will have associated with it at least one node physical layer controller. In certain circumstance, a given component may be associated with multiple nodes. Usually, however, there will be a one-to-one correspondence between devices or components on the bus and nodes.

Figure 1:
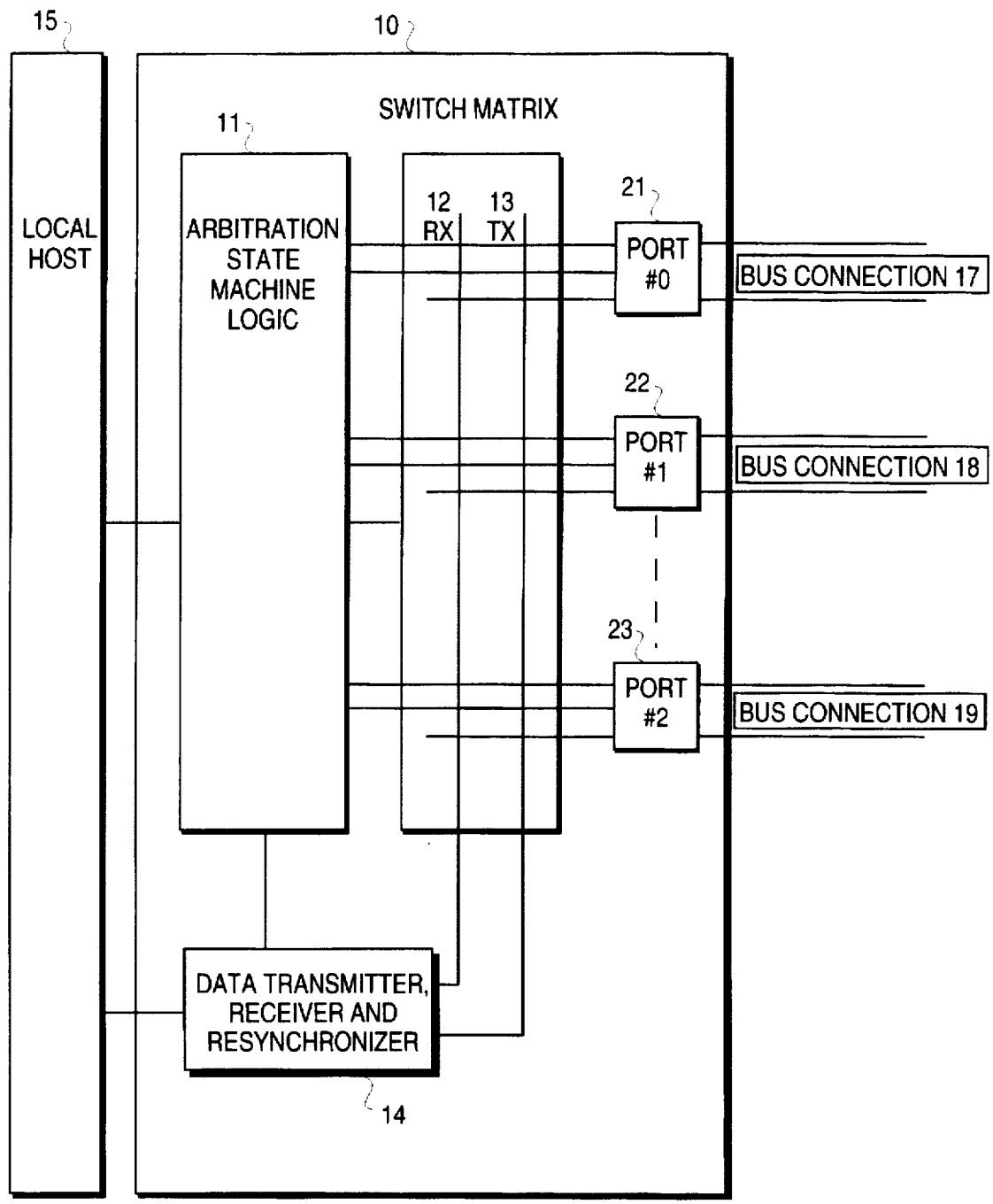
FIG. 1 shows a node having a number of port connections and coupled to a local host.

Referring now to FIG. 1, a block diagram of a node 10 is illustrated. The physical implementation of a node is somewhat arbitrary. In the preferred embodiment, the nodes are designed to comply with the IEEE P1394 high performance serial bus communications protocol. The node 10 includes arbitration state machine logic 11. This arbitration state machine logic incorporates all the logic circuitry for carrying out the methodologies and algorithms to be described herein. The circuitry may comprise a programmable logical array (PLA) or be uniquely designed to carry out the functions described herein. Those skilled in the art, once described the functions to be carried out by the node logic, will be able to implement the present invention without undo experimentation. The node, by means of its logic, shall implement the minimum arbitration protocol including the bus initialization, tree identification, and self-identification described above and the bus arbitration functions described in detail below.

The node 10 shown in FIG. 1 also includes transmission multiplexors 12 and 13 and data transmitter, receiver and resynchronizer 14. The node illustrated in FIG. 1 is coupled to local host 15. Local host 15 may, as discussed above, be any device one wishes to attach to the bus, such as a disk drive, CPU, keyboard, or any other component which needs to communicate with other components in the system. The node 10 communicates with other nodes through communications links. A link is a connection between two ports and in immediate practical terms is a cable segment but in general it may be implemented as any physical communication channel. At a minimum, the link is able to provide a half duplex communication channel between the two ports which it connects. A port is the interface between a node and a link. In accordance with the present invention, a port must have the ability to transmit and receive data and arbitration signaling. A port needs to be able to determine whether or not it is connected to another port through a link. One method of facilitating this is by having connected ports apply a biasing voltage through the link which is detectable by the port at the other end of the link. Thus, if a port has a link attached which is not connected to a port at the other end, a so-called naked link, the port will determine that it is not a connected port. In FIG. 1, the illustrated node 10 has three external ports 21, 22 and 23 with connecting links 17, 18 and 19, respectively.

It will be appreciated from above that an individual node may have more than one port. In addition, each node is able to transmit and receive data on any one of its ports. A node is also able to receive and transmit signaling messages through all of its ports. This may occur simultaneously and independently. Separate signaling transceivers, encoders and decoders are thus required for each port of a node. It is conceivable that a node may not have an associated local host device. In such cases, the node may function as a cable repeater. In the discussion which follows, devices and local hosts will, for the most part, be omitted and all references to bus topology will refer to nodes and node connections through various ports.

Figure 2:
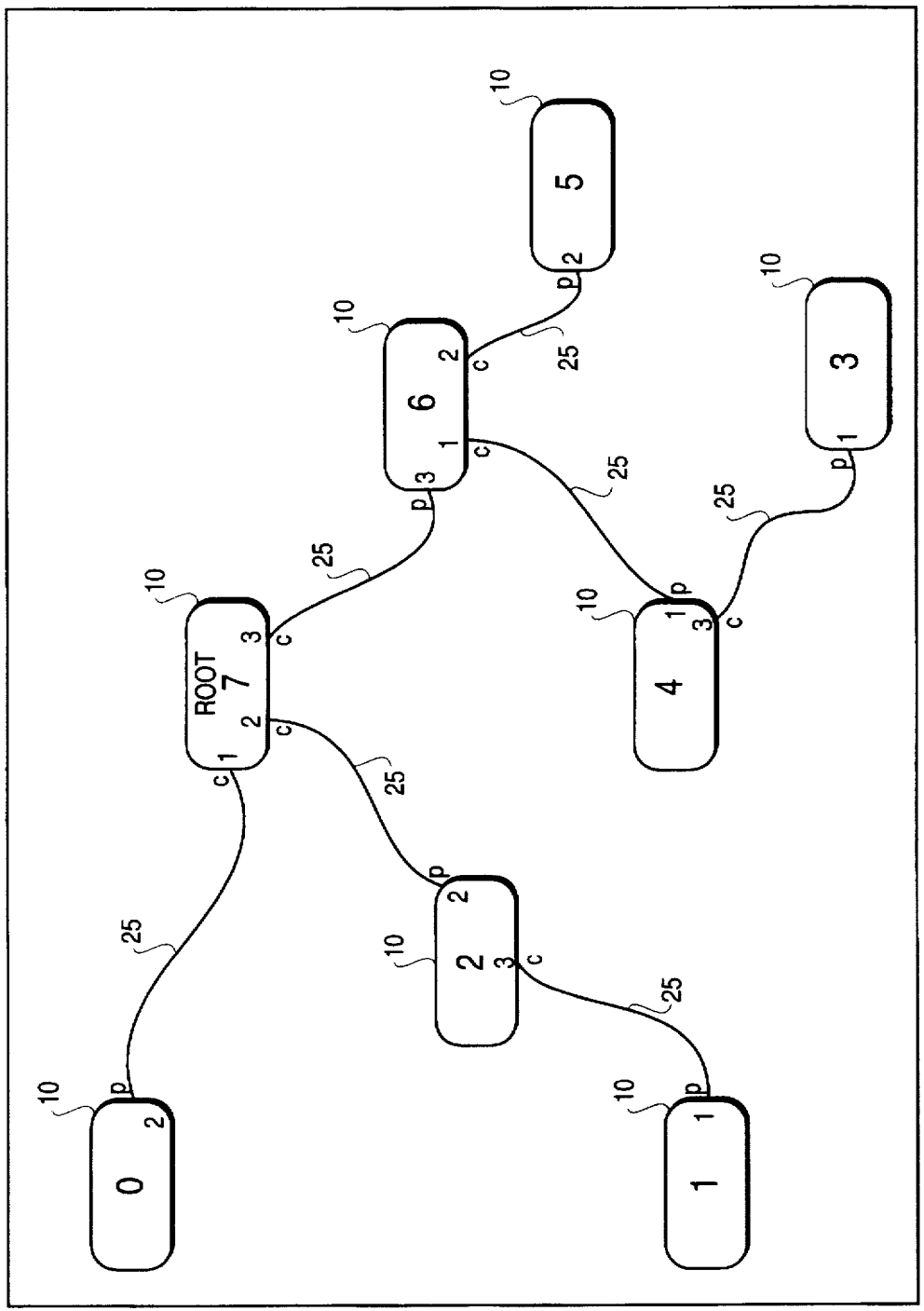
FIG. 2 shows a serial bus according to one embodiment.

FIG. 2 shows a typical 1394 bus topology. Eight nodes 10 labeled 0 through 7, are shown interconnected. It will be appreciated by those skilled in the art that the tree structure depicted in FIG. 2 resembles an acyclic directed graph. That is, the bus topology is such that there are no loops, hence the term acyclic. A hierarchical relationship between nodes 0–7 has been established as indicated by the labels "p" and "c" at the ports of the nodes, hence the graph is said to be directed. A "p" at the port of a node 10 indicates that the bus connection is pointing towards the parent of that node. Similarly, a "c" at the port of a node 10 indicates that the bus connection is pointing towards the child of the node. For example, port 2 of node 0 is labeled with a "p". This indicates that the bus connection at port 2 of node 0 points towards the parent of node 0, that is, node 7. Likewise, port 1 of node 7 is labeled with "c", indicating that the bus connection points towards the child of node 7, i.e., node 0. It will further be appreciated that node 7 has become the root node of the graph. This is apparent because node 7 has no parent node. The root node in a 1394 bus is defined as the node with no parent. Node 7 and node 0 are connected through communication link 25. Although all communication links 25 between nodes 0–7 are similarly labeled, it will be appreciated that different physical components, such as cables, optical fibers, wireless couplings, etc., could be used and, therefore, the similarity of labeling reflects the fact that the links carry out similar functions and are not necessarily physically identical.

Figure 3:
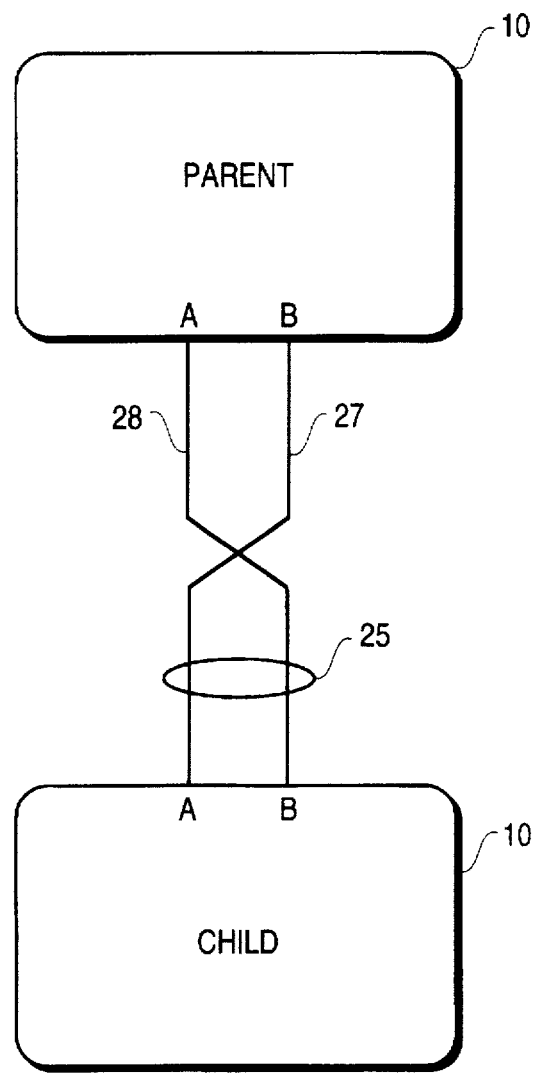
FIG. 3 shows two nodes connected by a pair of differential signal lines.

FIG. 3 more clearly indicates the anatomy of communication link 25. It will be appreciated that the same type of communication link exits between any two nodes, parent and child. Communication link 25 is comprised of two twisted pairs, 27 and 28, although other physical media could be used as discussed above. Each cable carries at least these two pairs, as well as signal ground and, optionally, power. It will be appreciated that communication link 25 could be a single cable comprising six conductors, that is, the two signal pairs and one power pair. As shown in FIG. 3, each port of each node 10 has an A pair and a B pair. Every cable 27 or 28 swaps the A pair and B pair of a parent and child node. By applying a bias voltage to the A pair, and detecting the bias voltage on the B pair, port connect status is sensed. In operation, the A pair of a child node port is coupled via a cable 27 to the B pair of its parent node port. The B pair of a child node port is coupled by a cable 28 to the A pair of its parent node port.

FAIR ACCESS BUS ARBITRATION

Figure 4:
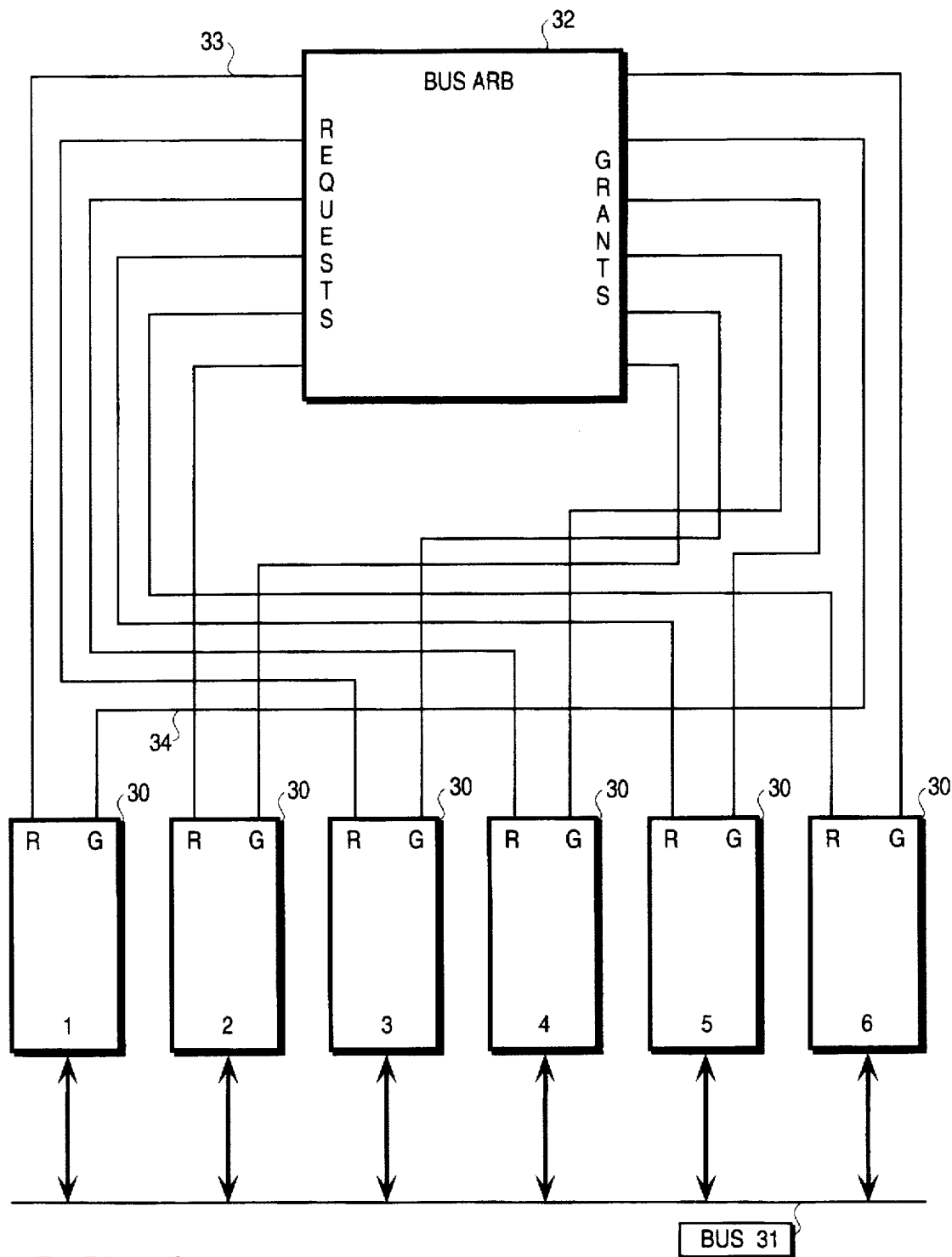
FIG. 4 shows a typical bus arbitration scheme for a parallel bus of the prior art.

The usual 1394 bus arbitration (so-called fair access bus arbitration) emulates the "look and feel" of typical bus arbitration. FIG. 4 shows a typical non-1394 serial bus arrangement. Nodes 30 are connected to the bus 31. Any node 1 through 6 wishing to transmit a data packet must first request access to the bus. For the example shown in FIG. 4, bus access is controlled by bus arbiter 32. Bus access is typically achieved by a node 30 sending a request signal to bus arbiter 32 on a request line 33. The bus arbiter operates according to an arbitration protocol and will grant access to the bus by sending a grant signal on line 34 to the requesting node. Once the node 30 has received the grant signal, it transmits its data on bus 31.

As indicated above, for the case of a 1394 bus, bus access requests are handled by the arbitration state machine logic of the nodes on the bus. The bus request and grant procedure involves line state signaling which is best understood with reference to the manner in which data packets propagate on a 1394 bus.

Figures 5A, 5B, 5C:
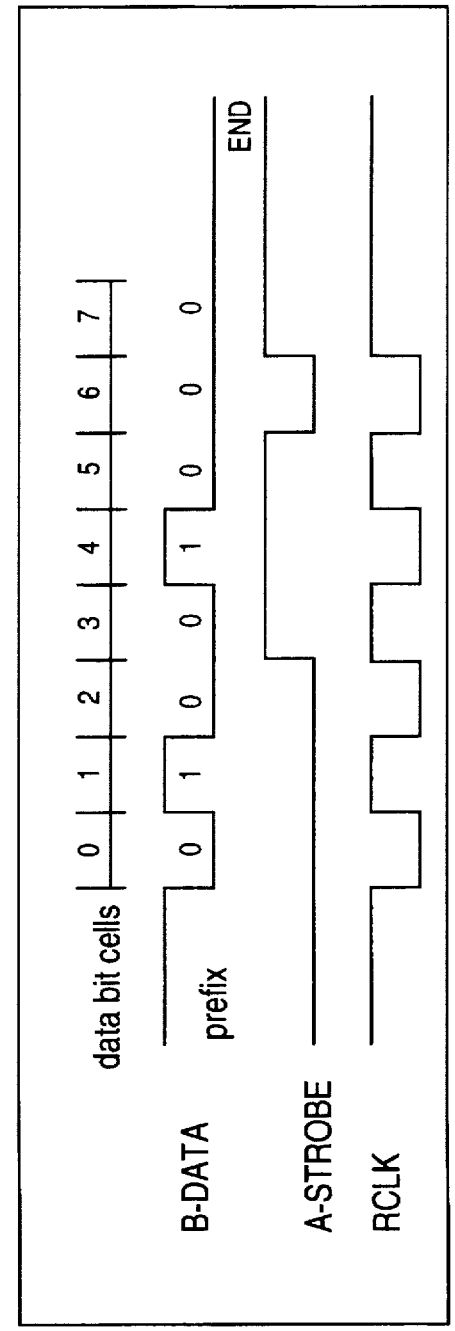
FIGS. 5a and 5b show typical data packet propagation on a serial bus.
FIG. 5c shows a typical AB line state during transmission.

FIGS. 5a and 5b show typical data packet propagation. Every data packet on the bus is preceded by a special AB line state: "data prefix". Similarly, data packets are followed by an AB line state which can either be "data end" or another "data prefix". As shown in FIG. 5b, the ending "data prefix" is used when multiple data packets are chained together. Any time a node sees "data prefix" arriving on a port, it forwards the "data prefix" line state out its other ports and readies its receiver circuitry 14. When the data arrives, it is repeated through to the other ports, as is the following line state signal ("data end" or another "data prefix"). It will be appreciated that the "data prefix" must propagate through the nodes as fast or faster than a data packet.

As indicated above, each port for each node has an A pair and B pair. When the bus is idle, both A and B pairs are in high impedance state. During active states, nodes send data out on the B pair and send a strobe signal out on the A pair. As shown in FIG. 5c, the strobe signal is the same as the data signal for even numbered bit times and is the opposite of the data signal for odd numbered bit times. Exclusive ORing the data signal and the strobe signal together generates a receive clock signal.

Before a node can transmit data, however, it must first gain access to the bus. In ordinary operation, a node requests bus access by setting its parent's B pair to a logic 0. To grant access to the bus, the parent replies by setting its child B pair to logic 0. To deny the request, the parent sets its child B pair to a logic 1. This is further described with reference to FIGS. 6a and 6b.

As shown in FIG. 6a, a child node initiates a bus request by setting its parent port B pair to a logic 0. The node's A pair remains in a high impedance state (Z). For the case where the node which has asserted the bus request wins access to the bus, the child's parent node will assert a logic 0 on its B pair. As seen by the child node, however, the 0 will be returned on the child node's A pair. This is because the A and B pairs are swapped in the cable. Recognizing that it has received access to the bus, as indicated by the logic 0 state on its parent port A pair, the child node now sends a data prefix signal by bringing its parent port A pair to a logic 0 and its parent port B pair to a logic 1. Then, the data packet is sent on the B pair and the strobe is sent on the A pair. When the packet has been completed, the child node sends a data end signal by bringing its B pair to logic 0 and A pair to logic 1.

FIG. 6b is a similar line state diagram for the case where the child node loses its attempt to gain access to the bus. The child initiates the bus request by bringing its B pair on the parent port low while the A pair remains in high impedance state. However, this time instead of receiving a logic 0 on its A pair, which would have indicated an arbitration win, the child receives a logic 1 on its A pair. This indicates that the child node is receiving a data prefix which is being transmitted by its parent node. This tells the child node that it has lost its arbitration bid and it configures its receive circuitry 14 to await the data packet. That data packet is then transmitted from the node's parent, followed by the data end signal.

Figure 7A:
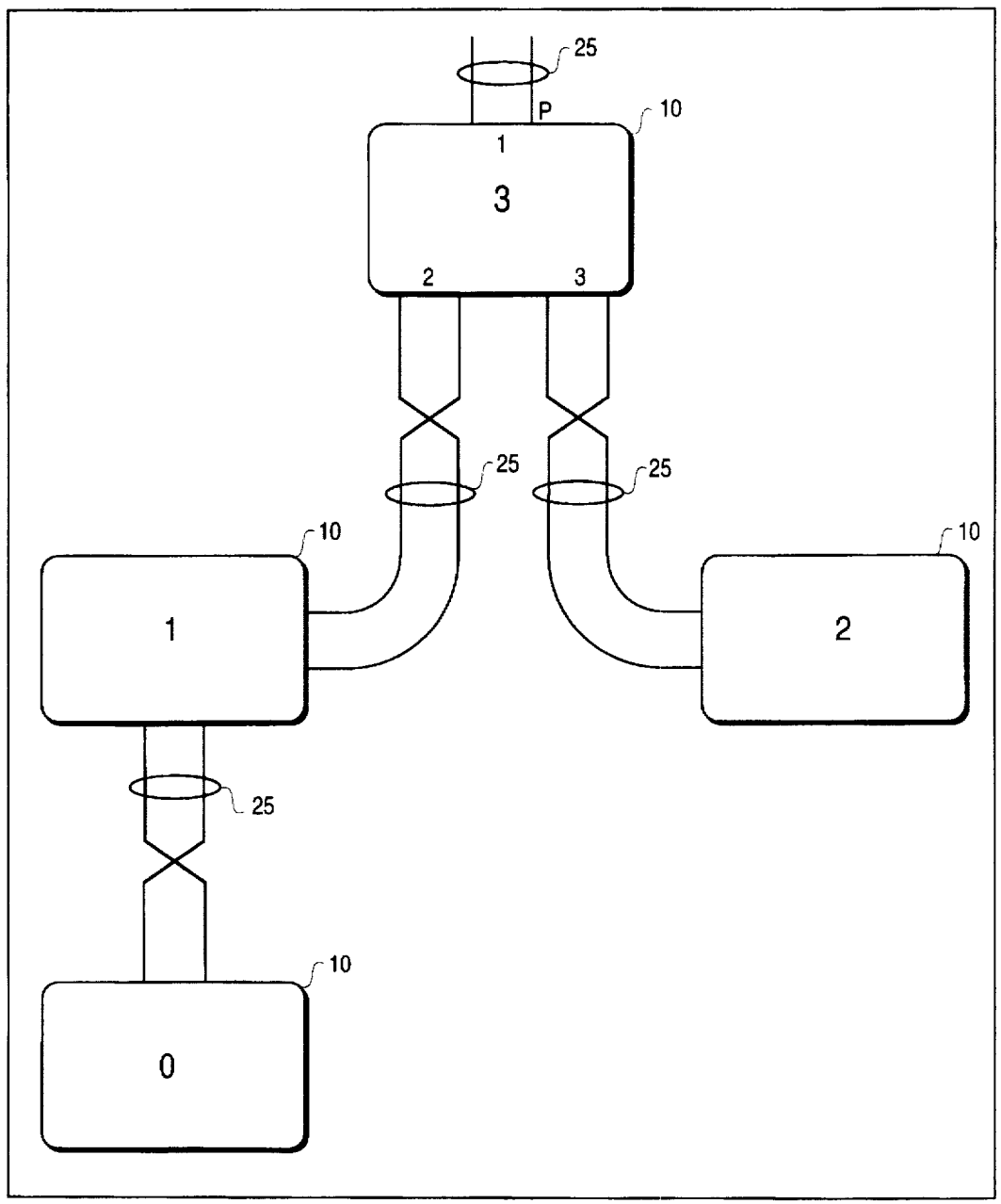
FIG. 7a shows four nodes of a serial bus interconnected to form part of an acyclic directed graph.
Figure 7B:
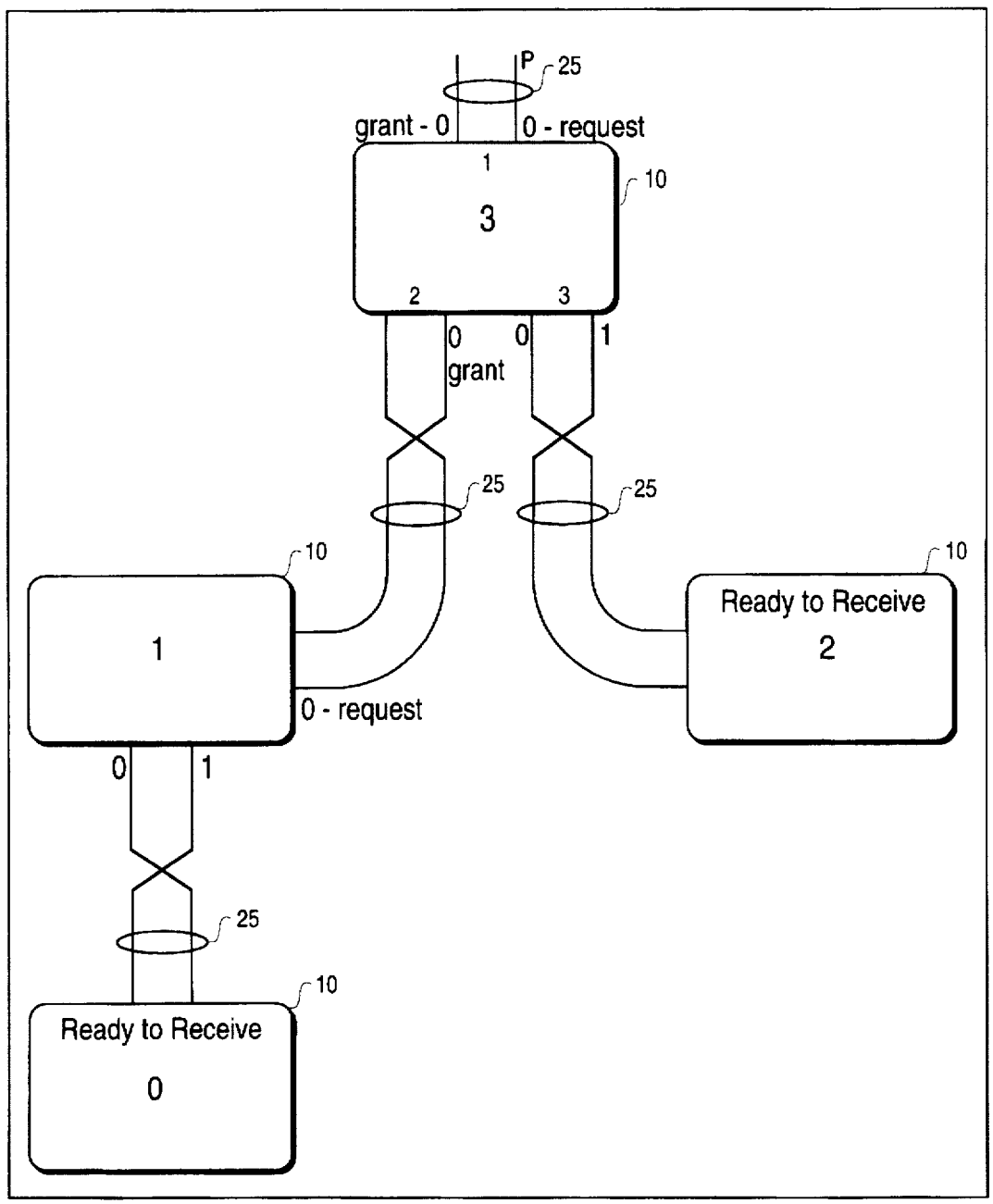
FIG. 7b shows the portion of the serial bus from FIG. 7a wherein an arbitration request is propagating through the network.
Figure 7C:
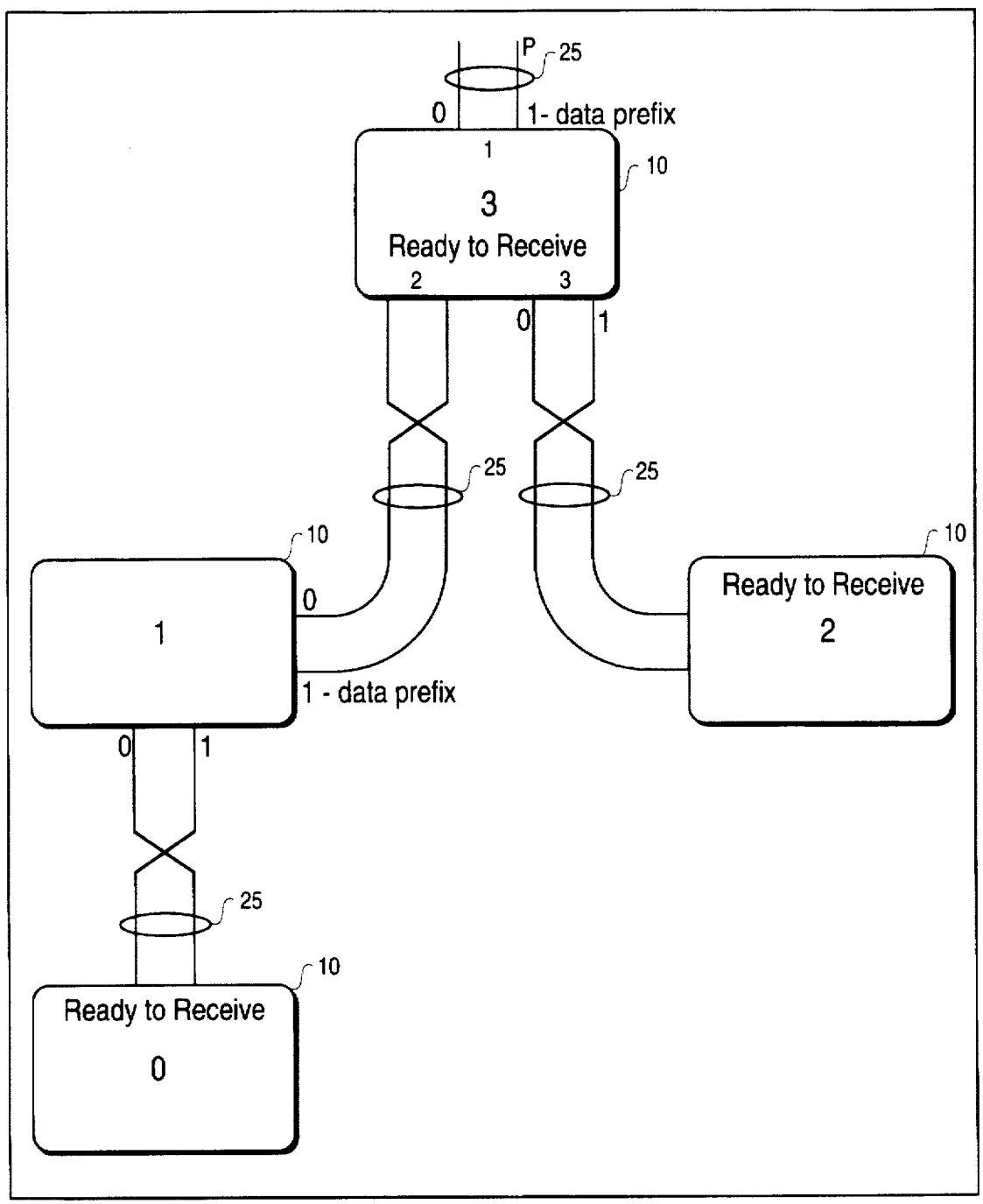
FIG. 7c shows the completion of the arbitration request begun in FIG. 7b and the beginning of a data transmission through the network.

FIGS. 7a, 7b and 7c further illustrate this arbitration process.

In FIG. 7a, four nodes 10, 0–3 are shown. Node 0 is the child of node 1. Nodes 1 and 2 are the children of node 3. Node 3 is the child of a parent node (not shown). In accordance with the above arbitration rules, and as discussed with reference to FIG. 7b and 7c, a bus request is transmitted up through a node's parents towards the root. At the same time, the parent node will assert data prefix on its other child ports so that those nodes will not be able to request bus access.

As shown in FIG. 7b, node 1 has asserted a bus request by sending a logic 0 on its parent port B pair. At the same time, node 1 has sent data prefix (AB=01) out its child port. In response to the data prefix signal, node 0 has configured its receive circuitry accordingly.

The bus request signal from node 1 has been transmitted by node 3 up through its parent port. At the same time, node 3 has asserted data prefix on its child port 3 and node 2 has configured itself accordingly and is ready to receive. In response to the request signal from node 3, a root node (not shown) has sent a bus grant signal which has been transmitted down through node 3's child port 2 to node 1.

In FIG. 7c, node 1 has received the bus grant signal and is now asserting data prefix by setting its parent port B pair to a logic 1. In response, node 3 configures its receive circuitry accordingly and transmits the data prefix signal on up through its parent port. In response to this data prefix signal, other nodes along the bus will prepare their receive circuitry and the data packet to be transmitted by node 1 will be propagated on through the bus. After sending its data, node 1 will send data end and, finally, will set its ports to high impedance. The data prefix (to be followed by the data packet and the data end) is also being sent out by node 1 on its child port.

Figure 8A:
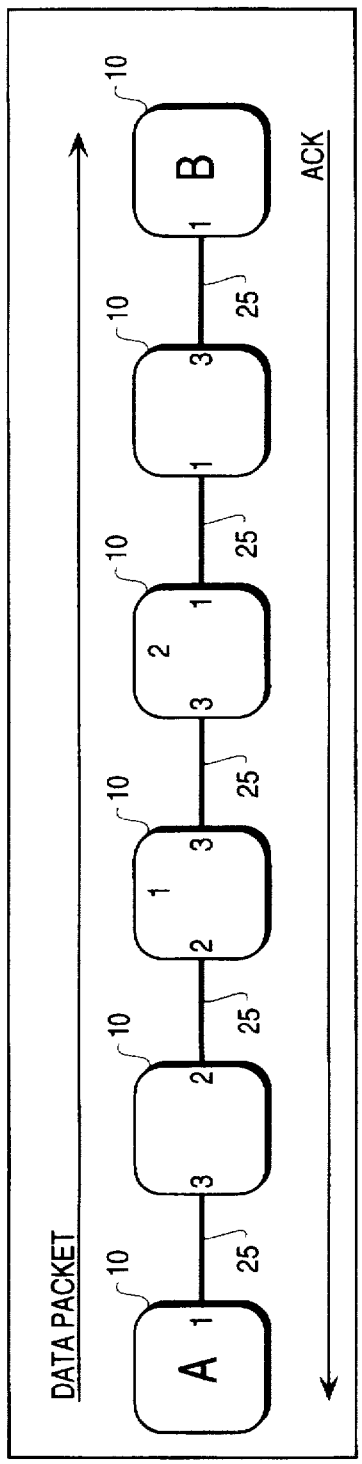
FIG. 8a shows a typical bus configuration arranged as a daisy chain.
Figure 8B:
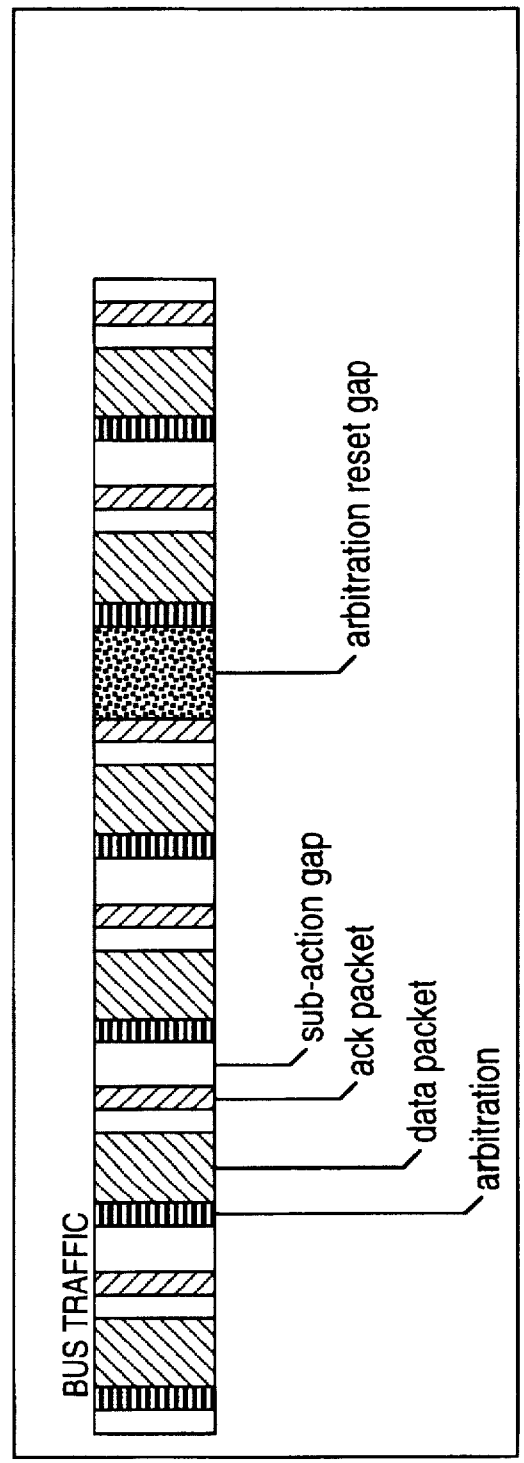
FIG. 8b shows an idealized representation of asynchronous bus traffic.
Figure 8C:
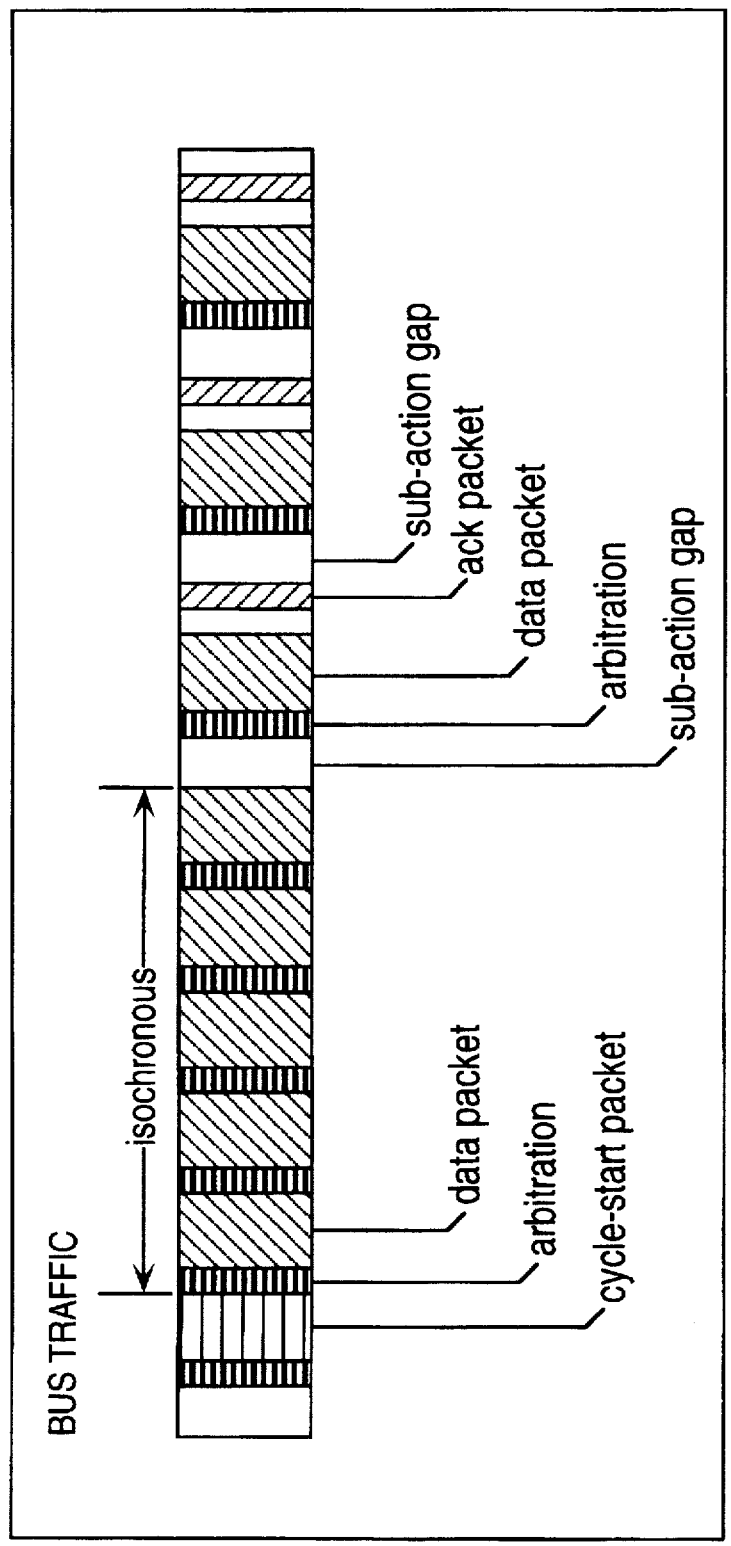
FIG. 8c shows an idealized representation of isochronous bus traffic.

FIGS. 8a, 8b and 8c provide another illustration of bus traffic on a 1394 bus. This time, as shown in FIG. 8a, the bus has been redrawn in a daisy chain configuration. It will be appreciated that this illustration is being used simply to aid in the understanding of the present discussion and that the daisy chain represents a worst case scenario for transmission of data between the two nodes having the longest communication path between them on the bus. Node A arbitrates for the bus, wins, and then sends a data packet to node B. Node B seizes the bus immediately after receiving the packet and returns an acknowledgment signal ("ack") to node A. It will be appreciated that the transit time for the packet from node A to node B, plus the transit time for the ack signal from node B back to node A is the worse case round trip delay for the network. The 1394 Serial Bus Standard defines a time ($T_{SA}$) for the network as the sub-action gap. This time is slightly longer than the worse case round trip delay. During normal asynchronous arbitration, nodes may arbitrate for the bus after $T_{SA}$ until they send one data packet. After sending a packet, they cannot arbitrate for the bus again until a longer period of bus idle is detected. This insures arbitration fairness. The longer period of bus idle is called an arbitration reset gap and is roughly twice as long as a sub-action gap.

FIG. 8b shows an idealized representation of bus traffic. A period of bus arbitration is followed by a data packet transmission from one node. Almost immediately following the data packet transmission, an ack packet is sent from the receiving node. This is followed by a sub-action gap after which another arbitration round occurs. The arbitration reset gap is shown as a longer period of time.

In addition to normal asynchronous traffic, 1394 buses can operate in a special mode: isochronous operation. Isochronous mode begins upon receipt of a cycle start packet, typically generated by the root. Importantly, isochronous packets are never acknowledged and bus arbitration may begin as soon as packet transmission is over. When a sub-action gap is detected, this indicates to the nodes on the bus that the isochronous mode is over. That is, it indicates that all nodes with isochronous traffic have completed transmission and ordinary asynchronous operation may resume.

In a typical implementation, a cycle start message is transmitted once every 125 microseconds. This may be delayed as there may be an asynchronous data packet transmission in progress when the time comes for another cycle start message to be transmitted. The cycle start packet includes a field which indicates by how much its transmission was delayed. This allows all nodes in the bus to keep their isochronous timing in sync. In this manner, isochronous and asynchronous operation can coexist on the network without interference.

TOKEN PASSING BUS ARBITRATION

As an alternative to the fair bus access arbitration scheme found in normal 1394 bus operation, a token passing bus arbitration scheme can be implemented. Metaphorically speaking, token passing bus access refers to the notion that a node may communicate on a bus when it is in possession of token that is passed between nodes (as opposed to having to request bus access and then waiting for a bus grant). The token is passed from node to node in a cyclic fashion so that each node receives the bus in a predetermined point in the cycle. Token passing is implemented for one embodiment following the same manner as physical address bus assignment is carried out when the network is initialized. Each node, when it is assigned a token will propagate its information packet on the bus while the remaining nodes listen. The node will then pass the token to the next logical node based on the predetermined sequencing method. Of course, other methods of token passing could be used and, as further discussed below, not all nodes on the bus need necessarily be token capable.

In order for token passing arbitration operation to occur, a "token master" must be designated. This could be the root node, or it could be some other designated node. The token master will initiate the bus grant to begin token arbitration operation. That is, the metaphorical token to be used will be an unrequested bus grant generated by the token master. The bus grant is propagated through the bus in accordance with the methods described below. Token arbitration will occur until all nodes, or certain designated nodes on a portion of the serial bus, have had a chance to transmit one or more data packets. Then, normal 1394 bus activity could resume until the token master generates another grant. In a non-1394 bus, this token-grant mechanism might be used as the sole means of bus arbitration.

During token arbitration operation, when a node acquires a grant it should take one of the following actions: First, the node could pass the grant down to a child port. For one embodiment, a mechanism is provided to enable or disable passing the grant down on a port-by-port basis, thus delimiting a particular serial bus topology into sections which use token style arbitration and other sections which do not. Second, the node could decline the grant and return it to its parent port. Third, the node could use the grant to transmit one or more data packets. The last data packet transmitted preferably carries with it some encoding to indicate that the grant is being sent back up to the parent node. If the parent node wishes to use the returned grant to transmit a data packet itself, it should delete this encoding as it retransmits the data packet sent by the child node. Details of the encoding for a preferred embodiment will be discussed in detail below.

In token style arbitration, a serial bus node may be able to acquire a grant by one of three mechanisms: First, it could receive a grant on its parent port. For 1394 buses, the grant will be a line state signal, as in the self-id process. Second, it could receive a declined grant back from a child port. Third, after passing a grant down to a child port, it could receive a data packet back from that port with a signal encoded in the data packet indicating that the grant is now being passed back up.

Figure 9A:
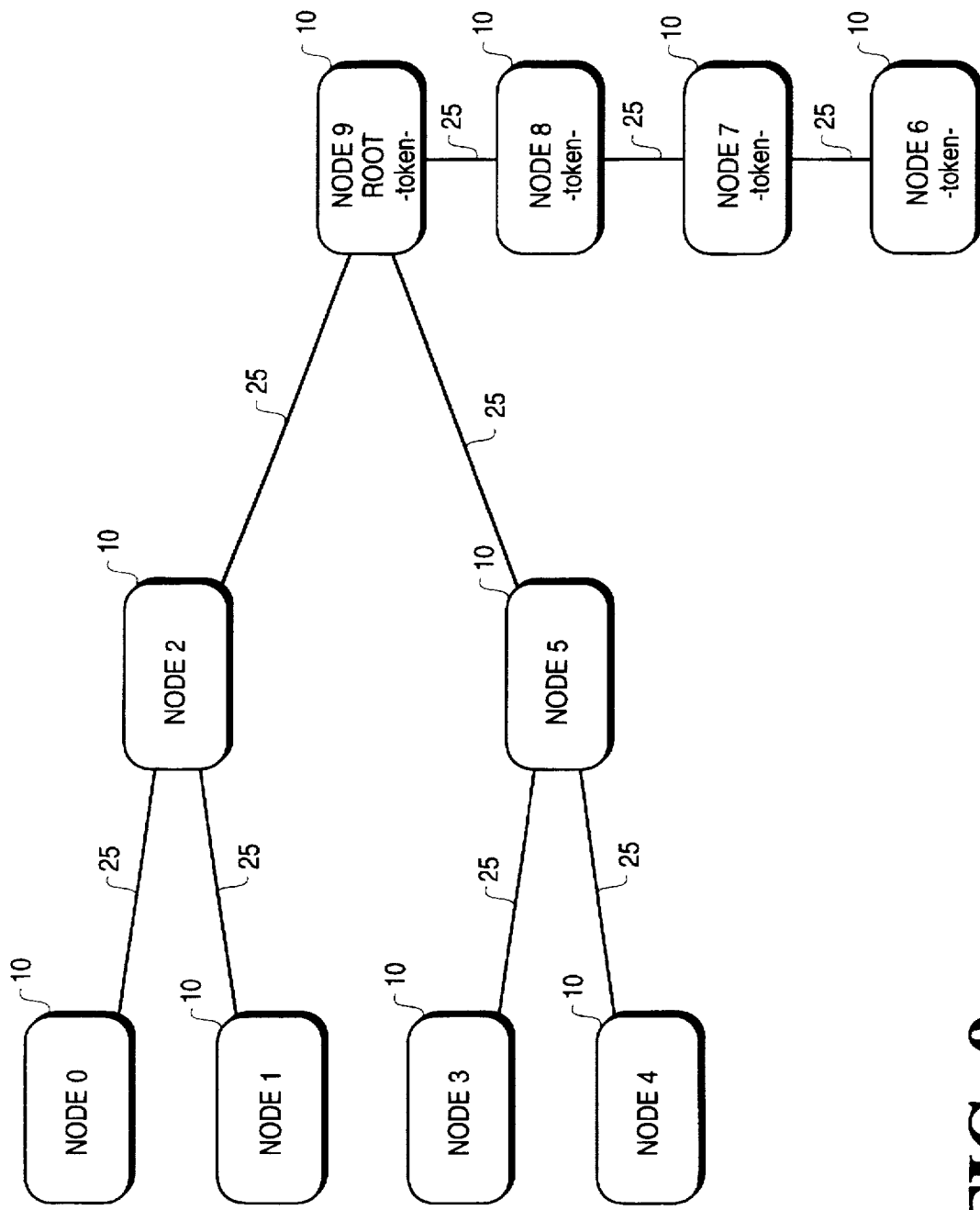
FIG. 9a shows one serial bus arrangement of token arbitration enabled nodes.
Figure 9B:
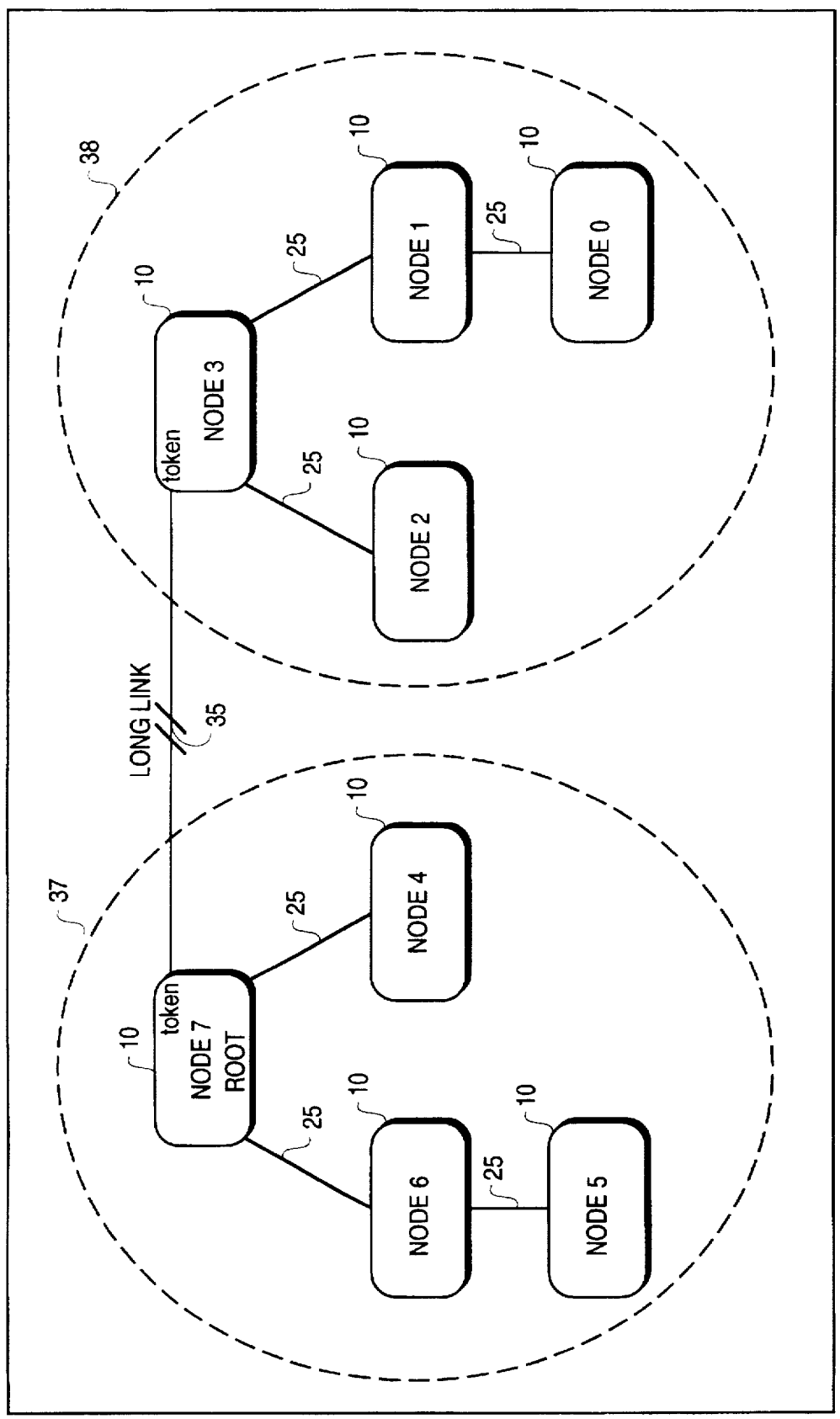
FIG. 9b shows an alternative serial bus arrangement of token arbitration enabled nodes.

FIGS. 9a and 9b show two possible applications for token arbitration on a 1394 bus. In the example shown in FIG. 9a, an isochronous network subsystem consisting of nodes 6–9 is coupled to the network. The isochronous subsystem could represent a video server, consisting of an array of disc drives. It will be apparent to those skilled in the art, however, that other possible isochronous subsystems could be used.

For the example shown in FIG. 9a, the operational sequence might resemble the following: The network could operate using normal 1394 bus arbitration and asynchronous traffic as described above. When the root node wins an arbitration round, it sends a cycle start message indicating that isochronous operation should commence. The other nodes on the bus would configure their circuitry accordingly. Then, the root, which also happens to be the token master for this example, initiates token operation by sending an unrequested grant down its child port to node 8. At the same time, the root sends a data prefix (bus denial) down its other child ports, which in this example are not enabled for token operation.

The bus grant (or token) drops all the way down to node 6. During this time, nodes 0–5 are prevented from arbitrating for the bus by the presence of the data prefix line signaling state. As a result, nodes 0–5 all go to a receive state and wait for incoming data packets.

With the grant having arrived at node 6, node 6 begins transmitting one or more isochronous packets. These packets are relayed to all nodes on the bus in typical 1394 fashion. The last data packet sent by node 6 will contain token passing encoding, indicating that the grant is being passed up to node 7.

When it receives the packet with token passing encoding, node 7 first removes the encoding from the packet and then retransmits the packet in typical fashion. Then, node 7 begins transmitting one or more of its own isochronous packets. Again, these packets are relayed to all nodes on the bus in normal 1394 fashion. When node 7 transmits its last data packet, the packet contains token passing encoding.

This continues for node 8 and node 9. Since no other nodes are enabled for token arbitration, once node 9 completes transmission of its isochronous packets, token operation for this cycle will end. At that time, node 9 deasserts the data prefix which it has been transmitting to its other child ports and normal isochronous operation continues. Now, nodes 0–5 can perform usual isochronous arbitration until all are done and a sub-action gap finally opens up. As indicated above, when a sub-action gap has been detected, the bus returns to "normal" asynchronous arbitration.

The above described form of arbitration has several advantages. First, it results in minimal isochronous arbitration time for nodes 6, 7, 8, and 9. Second, isochronous data streams from nodes 6–9 will always come in the same order. Also, there would be no timing penalty for a two-port versus a three-port node in token mode. This is because the daisy chain configuration for the token arbitration subsection is just as fast as a multibranching configuration. Further, if node 9 acted as a master node for nodes 6, 7, and 8, so that nodes 6, 7 and 8 never send or receive asynchronous traffic to the network at large, then nodes 6, 7 and 8 would not figure into gap count calculations. From a timing standpoint, they would be "free" and would not count towards the 16 hop maximum for ordinary 1394 operation.

It will be apparent to those skilled in the art that the above scheme will generally still work even if the "token master" is not the root node. In that case, the token master would arbitrate for the bus normally. When it wins the bus, the token master would then pass the grant on down to its token enabled child ports.

The above arbitration scheme could also be made to work for asynchronous transmissions. In a 1394 bus, a node would be able to transmit its packet in token style operation if it had the grant and the last packet was an ack or sub-action gap was detected. For a non-1394 bus, this might be viable general arbitration mechanism, particularly if immediate ack packets were not used.

FIG. 9b illustrates another possible network configuration. In FIG. 9b, the 1394 network consists of two separate clusters of nodes 37 and 38, separated by a long link 35. This long link 35 could be specialized transceivers with a very long cable or a standard 1394 hardware consisting of multiple repeaters and cable segments. An example might be a home theater environment, where one cluster 37 is composed of entertainment equipment such as a television, VCR, audio equipment, etc., and the other cluster 38 is composed of home office equipment such as a personal computer, printer, etc. Although only two clusters are illustrated, the principal could be extended to add additional clusters (say in other areas of the house). This arrangement would operate as follows:

The network begins in normal asynchronous operation. Nodes 4, 5, 6 and 7 arbitrate normally for the bus and send asynchronous packets. Nodes 0, 1, 2 and 3 try to arbitrate for the bus, but the node 3 phy (in token mode on its parent port) never sends the bus requests up.

When node 7 (the root node) detects an arbitration reset gap (i.e., the end of a fair arbitration interval), it drops a token grant down to node 3. Nodes 4, 5, 6 and 7 may now try to arbitrate for the bus, but the node 7 phy will ignore their requests until the grant comes back. Node 3 now acts like a local root for nodes 0, 1, 2 and 3. It grants access to the bus in response to bus requests from its child ports (and from its link IC).

Nodes 0, 1, 2 and 3 arbitrate normally for the bus (with node 3 acting like the root) and send asynchronous packets. When node 3 detects a sub-action gap, which indicates that nodes 0, 1, 2 and 3 have sent all their normal asynchronous traffic for the current fairness interval, it passes the grant back up to node 7. Nodes 0, 1 and 2 do not need to be aware of the token arbitration being used by nodes 7 and 3. This assumes the implementation includes ack accelerated arbitration—where nodes may begin asynchronous arbitration immediately after detecting an ack packet. This eliminates unnecessary subaction gaps.

When it receives the grant back from node 3, node 7 resumes its "rootship". Now, nodes 4, 5, 6 and 7 arbitrate normally for the bus and send asynchronous packets.

In the above example, mixed asynchronous and isochronous operation could occur. In such a case, node 7 (acting as the root) will send a cycle start message, shifting the entire bus into isochronous mode. Nodes 4, 5, 6 and 7 arbitrate for the bus and send isochronous packets. Nodes 0, 1, 2 and 3 may try to arbitrate for the bus, but the node 3 phy will not pass their requests up.

When node 7 detects a "local" sub-action gap, indicating that all nodes in the local cluster 37 have completed their isochronous transmissions, node 7 drops a token grant down to node 3. It should be noted that the local sub-action gap is based on timing considerations of the local cluster 37 only (i.e., the timing requirements of the long link 35 and the nodes which make up cluster 38 need not be considered). This shorter time-out can be used for isochronous mode because there are no ack packets.

When node 3 receives the token grant, nodes 0, 1, 2 and 3 now arbitrate normally for the bus with node 3 acting as a local root. These nodes send their isochronous traffic in the fashion described above. Eventually, node 3 detects its own "local" sub-action gap. It now checks the status of an asynchronous root bit. If set, node 3 retains rootship and nodes 0, 1, 2 and 3 begin asynchronous arbitration. If the asynchronous root bit is clear, node 3 returns the grant to node 7. The asynchronous root bit provides an indication of "who was root" before the isochronous traffic interrupted the asynchronous operation.

For the case where the asynchronous root bit is set, asynchronous arbitration with node 3 acting as root proceeds. If node 3 detects a sub-action gap, indicating that all asynchronous traffic has been sent from its local nodes 0–3 for this fairness interval, then it clears its asynchronous root bit and returns the grant to node 7. Alternatively, if node 3 detects a cycle start time, it returns the grant to node 7, without clearing its asynchronous root bit. This means that node 3, the acting root, must also keep track of the cycle start time. Node 7 then resumes rootship and its local cluster 37 resumes normal asynchronous arbitration until node 7 sends another cycle start message.

For the case where the asynchronous root bit is not set, node 3 would return the token grant to node 7. Then, nodes 4, 5, 6 and 7 would arbitrate for the bus normally, with node 7 as the root, and send asynchronous packets. If node 7 detects an arbitration reset gap, it drops the token grant down to node 3. This causes node 3 to set its asynchronous root bit, and node 0, 1, 2 and 3 begin asynchronous arbitration. Alternatively, node 7 may send out a new cycle start message, which restarts this whole process.

One advantage of this "root sharing" token arbitration is bandwidth. For the case where the long link 35 adds a delay on the order of a few microseconds or more (one microsecond being roughly 200 meters of cable or 6 repeaters for a 1394 bus), then the arbitration time for nodes in distant clusters begins to get significant. This problem is solved through the use of token arbitration.

Details of the bit encoding for 1394 bus token arbitration are now provided. It will be appreciated that similar encoding details can be implemented for token arbitration on a non-1394 serial bus. Ending a data transmission on the 1394 bus requires sending extra bits. These extra bits are known as "dribble bits". In short, there are two extra bits tacked on the end of a 100 Mbit packet, 4 for a 200 Mbit packet and 8 for a 400 Mbit packet. Of these dribble bits, the last two are specified to be both zeros for a "data end" (normal packet termination), or both ones for a "data prefix" (used to concatenate additional packets). The other dribble bits in the case of a 200 and 400 Mbit packet are always ones.

The last (or ultimate) dribble bit must be exactly as specified by the P1394 standard. Changing it to the opposite state would add one extra receive clock edge, as well as miscuing the hardware on whether data end or data prefix is intended. Such an error would be detrimental to operation of the bus.

The penultimate (or next to last) dribble bit has no such constraint. Advantageously, it is not simply relayed from phy to phy; it must be regenerated by each phy.

The penultimate bit, then, can be used for token passing. In one embodiment, for a child node passing a token up to its parent, if the last bit is a 1 (i.e., a data prefix, implying a concatenated packet will follow), then the penultimate bit is ignored. If the last bit is a zero (data end), the penultimate bit will indicate whether or not the token is being passed. In a preferred embodiment, the penultimate bit will be set to a 1 to indicate that the token is being passed up. Having the penultimate bit set to 0 indicates that the token is not being passed up. The reverse implementation could also be used.

Token passing downward from a parent to a child in a preferred embodiment is done with the line state signal token grant AB=Z0. Token passing upward from a child to a parent may be done with a line state signal token return AB=Z0 or by penultimate bit encoding. For systems where the token is being passed up a daisy chain of nodes (e.g., nodes 6–9 in FIG. 9a), the penultimate bit encoding is particularly efficient. When a parent node receives a packet from a child node with the last two bits set to 10 (token being passed, data end), then it can relay the packet on through the network with the last two bits set to:

00 (no token, data end) if it wants to send its own isochronous packets;

10 (token passed, data end) if it has no isochronous packets to send; or 01 (no token, data prefix) if it wants to concatenate its isochronous packets onto the preceding one. This re-encoding of the last two data bits can be done on-the-fly.

FIGS. 10a–10i further illustrate the token passing arbitration. For the example shown, only isochronous data transmission is discussed and it is assumed that the root node also acts as the token master. Upon review of these details, however, it will be apparent to those skilled in the art that similar implementation can be used for other cases.

Figure 10B:
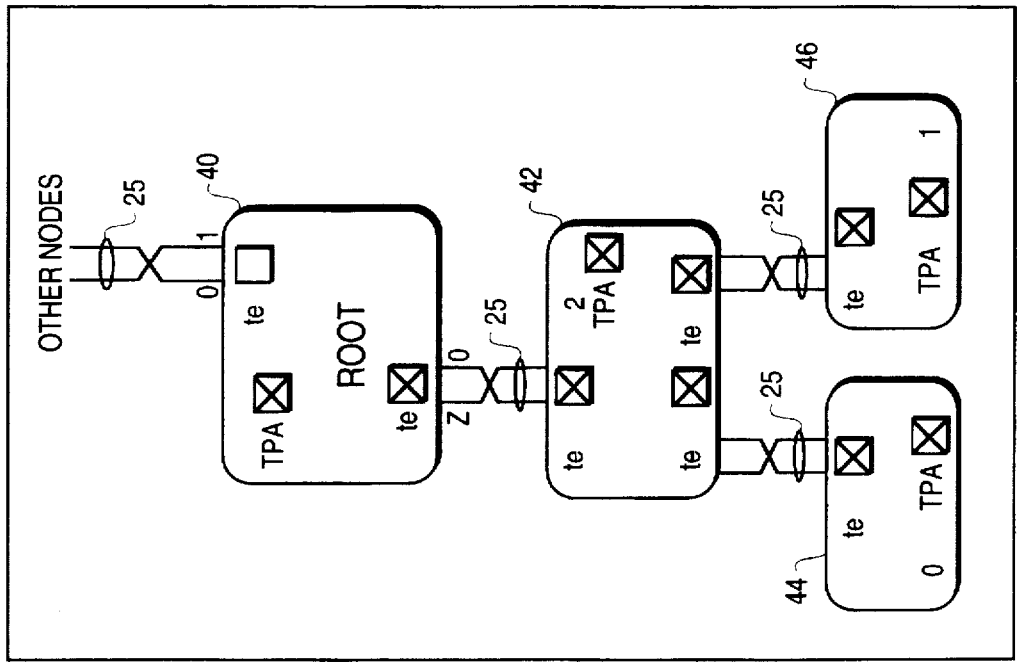
FIGS. 10a–10i show the steps involved in token passing arbitration on a serial bus in one embodiment.
Figure 10A:
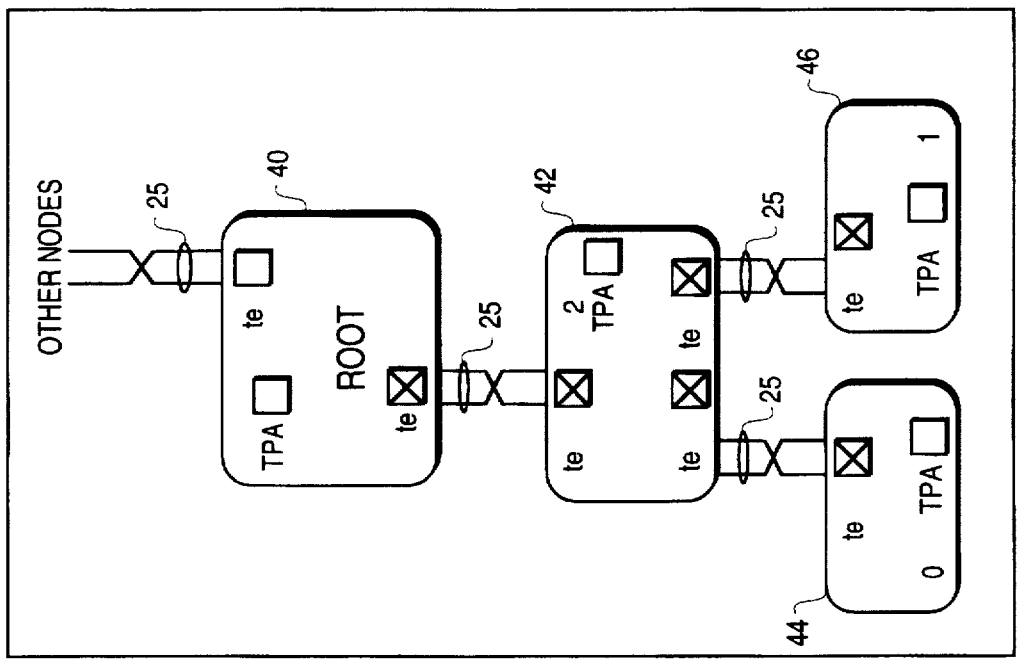

FIG. 10a shows the initial state. As indicated, each port of each node has a new status bit: $t_e$ (token enable), which enables token operation on that port. All nodes also have a TPA bit (token protocol active), which is set when the cycle start packet is transmitted (in the case of the root) or received (in the case of all other nodes). A node clears its TPA bit when it returns the token grant. If a node has no ports with $t_e$ set, then it never sets its TPA bit.

At start up, for the example shown in FIGS. 10a–10i, the root has $t_e$ set for one child port only. It will be appreciated that these $t_e$ bits could be set by software, by hardware jumpers, etc., techniques well known in the art.

The root node is indicated by the numeral 40. The other nodes 42–46 in this token arbitration branch have their $t_e$ bits set on all ports. The "Other Nodes" (not shown) have their $t_e$ bits all cleared. These nodes may be normal 1394 nodes without token arbitration cognizance.

In operation, the nodes could use standard 1394 arbitration for asynchronous traffic. The switch to token arbitration would come when the root 40 sends out the cycle start packet, which causes all token enabled nodes 42, 44 and 46, to set their TPA bits.

FIG. 10b shows what happens next. The cycle start packet has been sent and nodes 40–46 have set their respective TPA bits accordingly. The root 40 drops a token grant (AB=Z0) to its lowest numbered token enabled port and sends data prefix (AB=01) out its other ports.

Figure 10D:
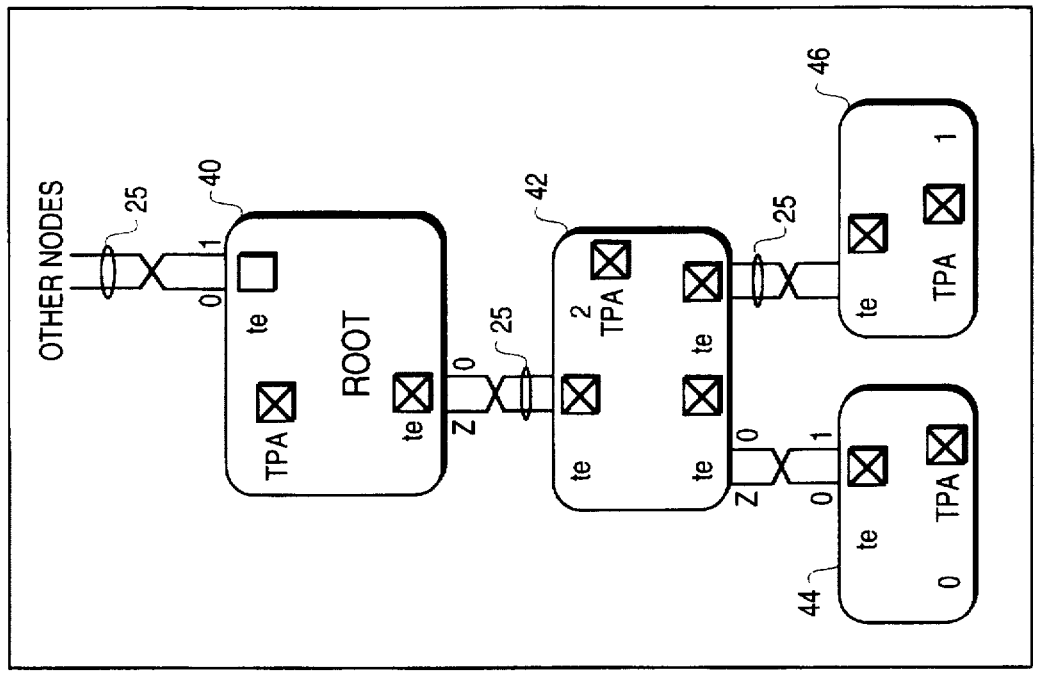
Figure 10C:
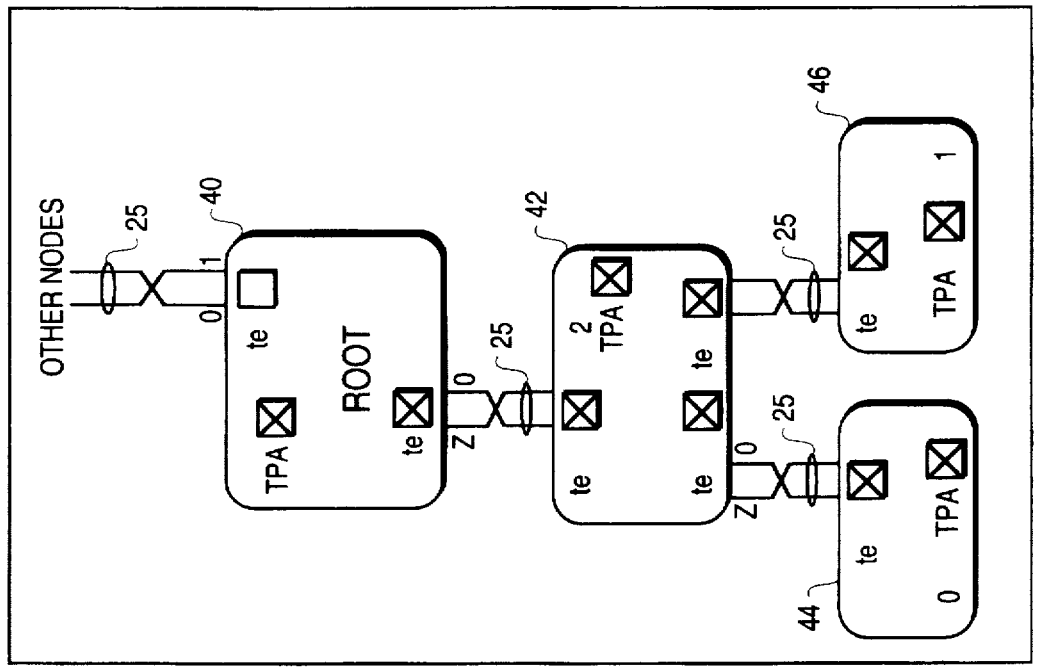

Then, as shown in FIG. 10c, node 2 (42) passes the grant on down to its lowest numbered token enabled child port (i.e., to node 0 (44)).

FIG. 10d shows that node 0 (44), which has isochronous packets ready to send, detects the grant transmitted by node 2 (42) and begins packet transmission by sending data prefix (AB=01) out its parent port. This data prefix will be retransmitted by node 2 (42) in the typical fashion. Node 0 (44) then sends data packets in the normal 1394 transmission fashion.

If multiple isochronous packets are transmitted by node 0, bandwidth will be conserved if they are concatenated together. The last packet terminates normally with data end (AB=10). The token is then passed back up from node 0 (44) to node 2 (42) using penultimate bit token passing as discussed above. As shown in FIG. 10e, node 0 (44) then clears its TPA bit.

In response to receiving the token grant back from node 0 (44), node 2 (42) now drops the token grant to node 1 (46), as shown in FIG. 10e. All this time, the root 40 continues to output data prefix (AB=01) to ports not enabled for token arbitration. This insures that other nodes cannot possibly detect a sub-action gap while the token protocol plays out.

Figure 10F:
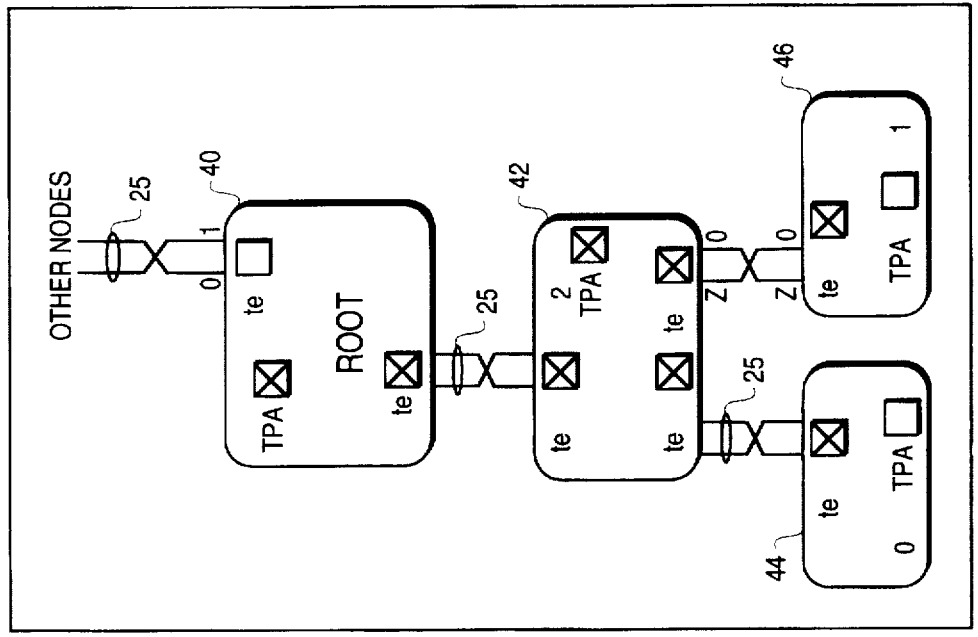
Figure 10E:
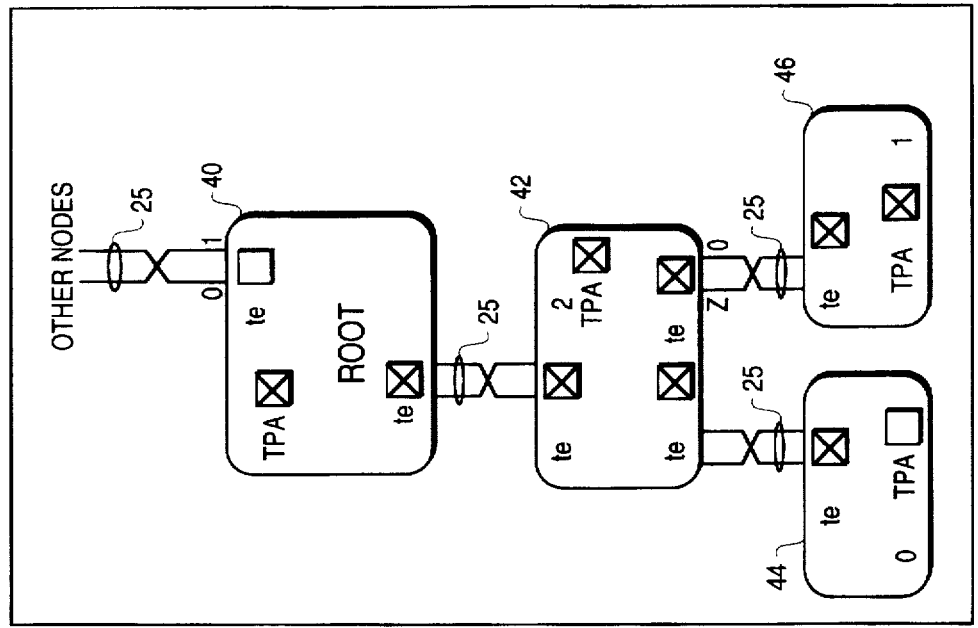

As shown in FIG. 10f, node 1 (46) has detected the grant from node 2 (42), however, node 1 (46) has no isochronous packets to send. Node 1 (46) therefore wishes to return the grant. One possible implementation for this would be to have node 1 (46) send a null packet, i.e., data prefix-data end. Although this would work, the null packet would propagate throughout the bus and simply waste bandwidth. A more efficient mechanism is for node 1 (46) to return the grant with the grant return signal AB=Z0 as shown in FIG. 10f. While token grant and grant return are both present on the interface, both nodes 1 (46) and 2 (42) detect AB=00. When a node returns the grant, either by penultimate bit signaling, or by this grant return, it clears its TPA bit as shown.

Figure 10H:
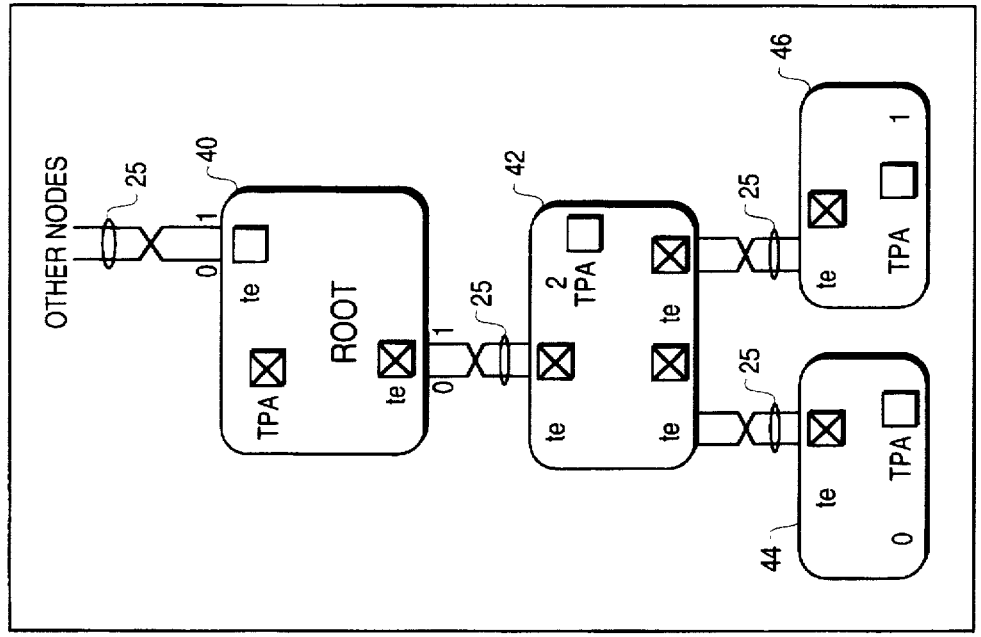
Figure 10G:
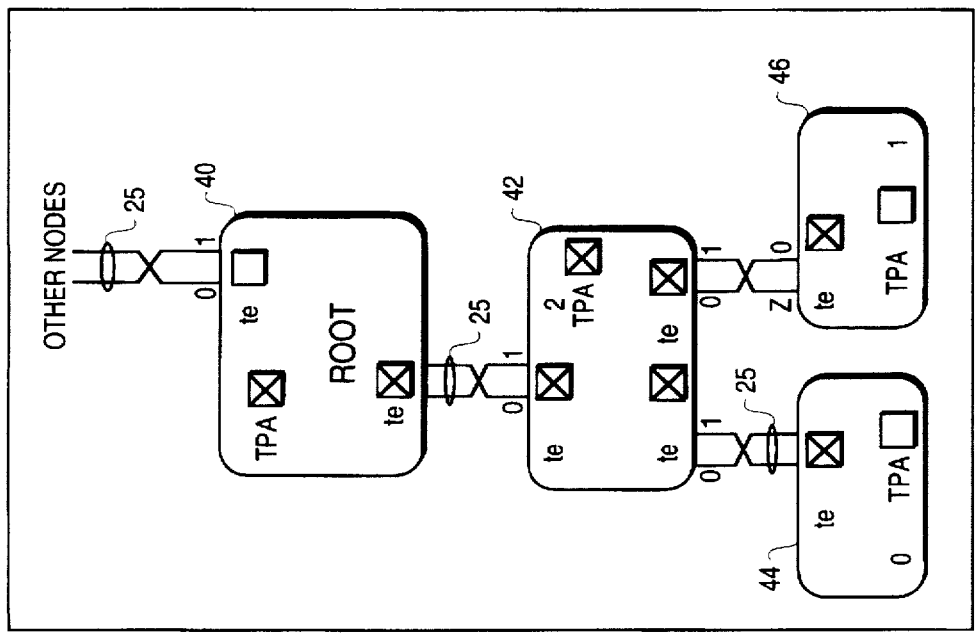

As shown in FIG. 10g, node 2 (42) detects the grant return and now transmits its own isochronous packets, starting with data prefix (AB=01). Node 1 (46) can detect data prefix even if it is still sending grant return as shown.

Referring now to FIG. 10h, node 2 (42) sends its isochronous packets in the normal fashion. Note that if node 2 (42) had no isochronous packets to send, it could send grant return (AB=Z0) on its parent port. In FIG. 10h, node 2 (42) has sent its last packet, passed the token back up with penultimate bit token passing, and has cleared its TPA bit. The root 40 has already recognized the return of the token, and has started putting out data prefix. It will next transmit its isochronous packets in the typical fashion.

Figure 10I:
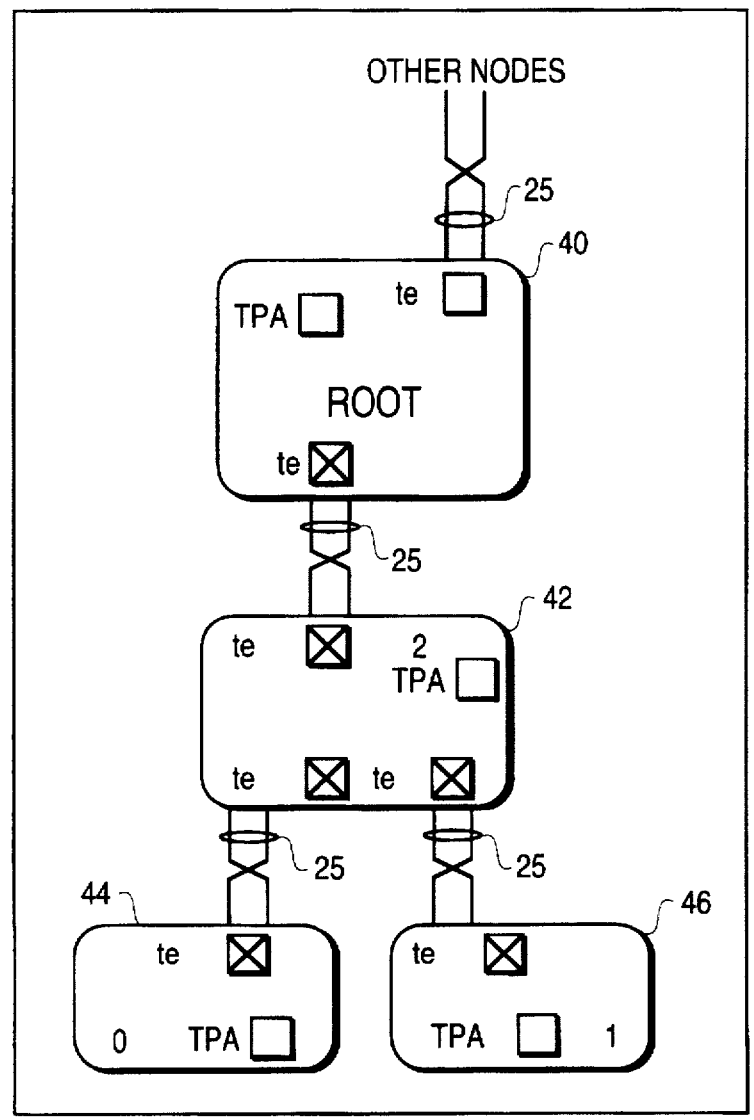

Referring now to FIG. 10i, when the root 40 has completed its isochronous transmission, it clears its TPA bit and returns to standard 1394 arbitration.

Thus, a novel method of token arbitration operation on the 1394 bus has been described. Although the present invention has been described in terms of preferred embodiments, it will be appreciated that various modifications and alterations might be made by those skilled in the art without departing from the spirit and scope of the invention. The invention should, therefore, be measured only in terms of the claims which follow.

What is claimed is:

1. In an electronic system comprising a plurality of components interconnected by a plurality of communication links, said plurality of components each having at least a first communications node wherein said communications nodes interface their associated component with a communications link through a node port, said nodes being capable of having a plurality of ports to which communications links to adjacent nodes couple, each node having a predetermined selection criteria established for selecting adjacent nodes coupled through its ports, said configuration of nodes and communications links comprising a directed acyclic graph wherein one node is designated a root node, all nodes coupled to only one adjacent node are designated leaf nodes, all other nodes in the graph being designated branch nodes, said acyclic directed graph having established hierarchical parent-child relationships between all adjacent nodes proceeding from the root node down to any leaf nodes wherein a leaf node has only one parent node and all nodes adjacent to the root node are child nodes with respect to the root node but parent nodes with respect to other adjacent nodes, the root node being defined as having no parent node, a method of token passing bus arbitration wherein a metaphorical token comprising an unrequested bus grant signal is passed from node to node in a cycle through the graph, the node having the token being the node with bus access, said method comprising the step of passing the token through the acyclic directed graph in an order determined by the predetermined selection criterion each node has established for selecting adjacent nodes, said method further comprising a step of returning the token by transmitting a token-refusal signal.

2. A method of token passing bus arbitration as in claim 1 wherein at least one of said plurality of communications links comprises a twisted pair.

3. A method of token passing bus arbitration as in claim 1 wherein at least one of said plurality of communication links comprises an optical fiber.

4. A method of token passing bus arbitration as in claim 1 wherein at least one of said plurality of communication links comprises a wireless coupling.

5. A method of token passing bus arbitration as in claim 1 wherein at least one of said plurality of communication links comprises a cable, the cable carrying two signal pairs and signal ground.

6. A method of token passing bus arbitration as in claim 5 wherein the cable further carries a power pair.

7. A method of token passing bus arbitration as in claim 1 wherein:

the node end the data transmission by transmitting a data end signal, the data ends signal comprises a penultimate bit and an ultimate bit, wherein the penultimate bit is encoded to indicate whether a metaphorical token is being passed by the node such that when the penultimate bit is set by the node the token is passed and the node relinquishes control of the bus.

8. A data communication system comprising:

a plurality of communication nodes, each of the communication nodes having at least one communication port, at least two of the communication nodes being capable of operating in a token passing bus arbitration mode;

a plurality of communication links interconnecting logically adjacent communication nodes through associated communication ports so as to form a configuration of communication nodes and communication links, the configuration of communication nodes and communication links comprising a serial bus;

wherein each of the communication nodes having a predetermined selection criterion established for selecting logically adjacent nodes coupled through its communication ports via one of the communication links so that the configuration of communication nodes and communication links comprise an acyclic directed graph wherein one of the communication nodes is designated a root node and one of the communication nodes is designated a token master node, all communication nodes coupled to only one adjacent communication node being designated leaf nodes, all other communication nodes being designated branch nodes, the acyclic directed graph having established parent-child relationships between all logically adjacent coupled communication nodes proceeding from the root node down to any leaf node;

wherein said token master node generates a token which is passed between the communication nodes having the capability of operating in the token passing bus arbitration mode such that the communication node in possession of the token has access to the bus; and wherein said token comprises an unrequested bus grant signal which may be returned by transmitting a token refusal signal.

9. A data communication system as in claim 8 wherein the communication node with access to the bus transmits information on the bus in the form of data packets and indicates that it has completed transmitting information by sending a data end signal.

10. A data communication system as in claim 9 wherein the node with access to the bus passes the token by transmitting a token-passing bit pattern as part of the data end signal.

11. A data communication system as in claim 10 wherein the token-passing bit pattern comprises penultimate bit encoding where the penultimate bit of the dribble bits is set so as to indicate that the token is being passed.

12. A data communication system as in claim 11 wherein when the penultimate bit of the dribble bits is set to a logical one the token is passed.

13. A data communication system as in claim 8 wherein said communications links comprising six conductor cables, said six conductors being arranged as two signal pairs and a power pair.

14. A data communication system as in claim 8 wherein each of said communications ports of said communications nodes are arranged as an A pair and a B pair and wherein said communications links are arranged between said communications nodes so as to couple the A pair of a child node's communication port to the B pair of the child node's parent node's communication port and to couple the B pair of the child node's communication port to the A pair of the child node's parent node's communication port.

15. A data communication system as in claim 8 wherein said communication links comprising twisted pairs.

16. A data communication system as in claim 8 wherein said communications links comprising optical fibers.

17. A data communication system as in claim 8 wherein said communication links comprising wireless coupling.

18. A data communication system as in claim 8 wherein the token master is the root node.

19. A data communication system comprising:

a plurality of communication nodes, each of the communication nodes having at least one communication port, at least two of the communication nodes being capable of operating in a token passing bus arbitration mode;

a plurality of communication links interconnecting logically adjacent communication nodes through associated communication ports so as to form a configuration of communication nodes and communication links, the configuration of communication nodes and communication links comprising a serial bus;

wherein each of the communication nodes having a predetermined selection criterion established for selecting logically adjacent nodes coupled through its communication ports via one of the communication links so that the configuration of communication nodes and communication links comprising an acyclic directed graph, the graph comprising a plurality of local clusters of said plurality of communication nodes, each of said plurality of local clusters of nodes having at least one of said communication nodes capable of operating in token passing bus arbitration mode, wherein one of the communication nodes is designated a root node and one of the communication nodes is designated a token master node, all communication nodes coupled to only one adjacent communication node being designated leaf nodes, all other communication nodes being designated branch nodes, the acyclic directed graph having established parent-child relationships between all logically adjacent coupled communication nodes proceeding from the root node down to any leaf node; and wherein said token master node generates a token which is passed between the communication nodes having the capability of operating in the token passing bus arbitration mode such that the communication node in possession of the token operates as a local root node for an associated one of said local clusters of nodes, the local root node receiving bus access requests from nodes within said associated local cluster of nodes and generating bus grant signals in response thereto.

* * * * *